US009218353B2

(12) United States Patent
Bakre et al.

(10) Patent No.: US 9,218,353 B2
(45) Date of Patent: Dec. 22, 2015

(54) METHOD AND SYSTEM FOR NAME SPACE PROPAGATION AND FILE CACHING TO REMOTE NODES IN A STORAGE SYSTEM

(75) Inventors: Ajay Bakre, Bangalore (IN); Girish Kumar BK, Banagalore (IN); David Slik, Vancouver (CA)

(73) Assignee: NetApp, Inc., Sunnyvale, CA (US)

( * ) Notice: Subject to any disclaimer, the term of this patent is extended or adjusted under 35 U.S.C. 154(b) by 705 days.

(21) Appl. No.: 13/481,374

(22) Filed: May 25, 2012

(65) Prior Publication Data

US 2013/0318229 A1 Nov. 28, 2013

(51) Int. Cl.
G06F 15/173 (2006.01)
G06F 17/30 (2006.01)
H04L 29/08 (2006.01)

(52) U.S. Cl.
CPC ...... *G06F 17/30132* (2013.01); *H04L 67/1097* (2013.01)

(58) Field of Classification Search
CPC .............. G06F 17/30132; H04L 67/1097
USPC .................. 709/224, 223, 217–219
See application file for complete search history.

(56) References Cited

U.S. PATENT DOCUMENTS

| 8,473,582 | B2 * | 6/2013 | Ananthanarayanan et al. ............. 709/218 |
| 8,751,449 | B2 * | 6/2014 | Carmichael ................ 707/626 |
| 2003/0204613 | A1 | 10/2003 | Hudson et al. |
| 2005/0198238 | A1 | 9/2005 | Sim et al. |
| 2006/0107085 | A1 | 5/2006 | Daniels et al. |
| 2006/0161635 | A1 | 7/2006 | Lamkin et al. |
| 2007/0233828 | A1 | 10/2007 | Gilbert |
| 2011/0145363 | A1 * | 6/2011 | Ananthanarayanan et al. ............. 709/218 |
| 2012/0254269 | A1 * | 10/2012 | Carmichael ................ 707/827 |

OTHER PUBLICATIONS

International Search Report for International Patent Application PCT/US2013/39258 (Dec. 16, 2013).

* cited by examiner

*Primary Examiner* — Kenneth R Coulter
(74) *Attorney, Agent, or Firm* — Gilliam IP PLLC (57) ABSTRACT

Systems and methods efficiently distribute information, such as path name, attributes and object information, corresponding to changes in a content repository to remote nodes in a network using storage-layer/object-based protocols. A difference monitoring client monitors name space and object space changes by identifying inodes which have been modified on storage volumes between two or more snapshots. The monitoring client builds a list which may include name information, object space information and attributes such as file size and permissions for each of the changed inodes that is utilized to update the edge nodes. Systems and methods also provide for geo-scale content distribution from a central repository to edge nodes using a storage-layer/object protocol. A caching mechanism is utilized to cache requested content at an edge node. Cached content may be maintained at the edge node during use and/or for an additional predetermined period. Difference monitoring client may track such cached content.

23 Claims, 4 Drawing Sheets

METHOD AND SYSTEM FOR NAME SPACE PROPAGATION AND FILE CACHING TO REMOTE NODES IN A STORAGE SYSTEM

TECHNICAL FIELD

The present invention relates generally to management of data within filesystems and, more particularly, management of data availability at a remote node of a storage network.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated within the data storage system and/or between data storage systems during normal operation. For example, when one or more users desire to access or download files, a portion or even the entire contents of a data volume may be sent across the network to be accessed by the user. In order to avoid poor user experience and other issues associated with latency in the data migration process of a particular data structure, some storage systems have begun implementing techniques to move data from one point in a network to a node which is closer to the edge of a network and proximate to the end user.

Typically, there are two considerations in serving data on an edge node of a network. One concerns providing and storing the data itself, and the other concerns providing the edge node with sufficient information such that the edge node may have knowledge regarding the contents and location of data in the storage network. In current systems, both considerations are accounted for using the same application layer protocol. In these systems, a content management system polls for changes in the storage system and pushes information regarding these changes to the edge nodes. A user accessing those changes may access the respective files using a web interface via a URL or similar addressing schema. Such systems cannot function in an object-space environment or by using a storage-layer protocol when accessing storage resources, such as a central storage repository, within the network.

Utilizing an application layer protocol to facilitate content management has further disadvantages in that it first requires a generation of a new protocol to obtain and manage information is generally administered within a storage network utilizing a different protocol. This causes inefficiencies because the new application-layer protocol must continuously poll for changes in the storage system when the storage system may already have mechanisms in place to track such changes.

BRIEF SUMMARY OF THE INVENTION

The present application provides for systems and methods which efficiently distribute information, such as name and object space information (e.g. path name, file attributes such as size, permissions, time stamp & UUID, etc.), corresponding to changes in a content repository to remote nodes in a network using storage-layer replication protocols. In one embodiment, a difference monitoring client monitors name space changes in a storage network by identifying inodes which have been created, deleted, accessed or modified on storage volumes within the network between two or more snapshots taken at a pre-determined time interval. The monitoring client builds a list having a name and object space information for each of the changed inodes. This list is utilized to update the edge nodes. Such information may allow clients at the edge of the network to access data from a storage system by accessing the name space visible on the edge node.

Systems and methods are also provided which provide for geo-scale content distribution from a central repository to edge nodes using an object protocol. In one embodiment, an object-level caching mechanism is utilized to retrieve and cache requested content, such as an entire file, at an edge node. Cached content may be maintained at the edge node during use, or may be maintained for an additional predetermined period. For example, cached content may be maintained such that it is available for subsequent utilization or transmission to another edge node.

In some embodiments, a difference monitoring client, such as a content metadata service client, also monitors and tracks locations of the cached content so as to track when data may be accessed at either the cached location or a central repository. In such embodiments, when data needs to be sent to an edge node, but the data is cached on a node which is closer (either physically or electronically) to the requesting edge node than the central repository, data may be sent from the cached storage in order to improve latency. Further in some embodiments, data requests involving multiple files may be sent from a combination of cached locations and/or the central repository.

As a result, embodiments greatly improve the efficiency/latency experienced by a user when accessing stored content. This is accomplished by one or more of providing for more efficient monitoring and updating changes to the storage network and utilizing object-level distribution and caching methods at the edge nodes.

In some embodiments, systems and methods may provide for efficient scalability of the storage network. For example, embodiments may be implemented using a system having nodes that range from a few in number to having hundreds of nodes. The described content caching assists in the distribution of traffic such that the load on a single storage resource is reduced, thereby allowing for additional resources to be available in the presence of high traffic. Additionally, the described name space replication methods may be scaled by altering difference monitoring intervals and timing of replication updates. Such scalability is simplified over previous systems which would require more complicated polling methods to be implemented with an increase in nodes in order to address communication protocol differences between user requests and messages propagating between components of the storage system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
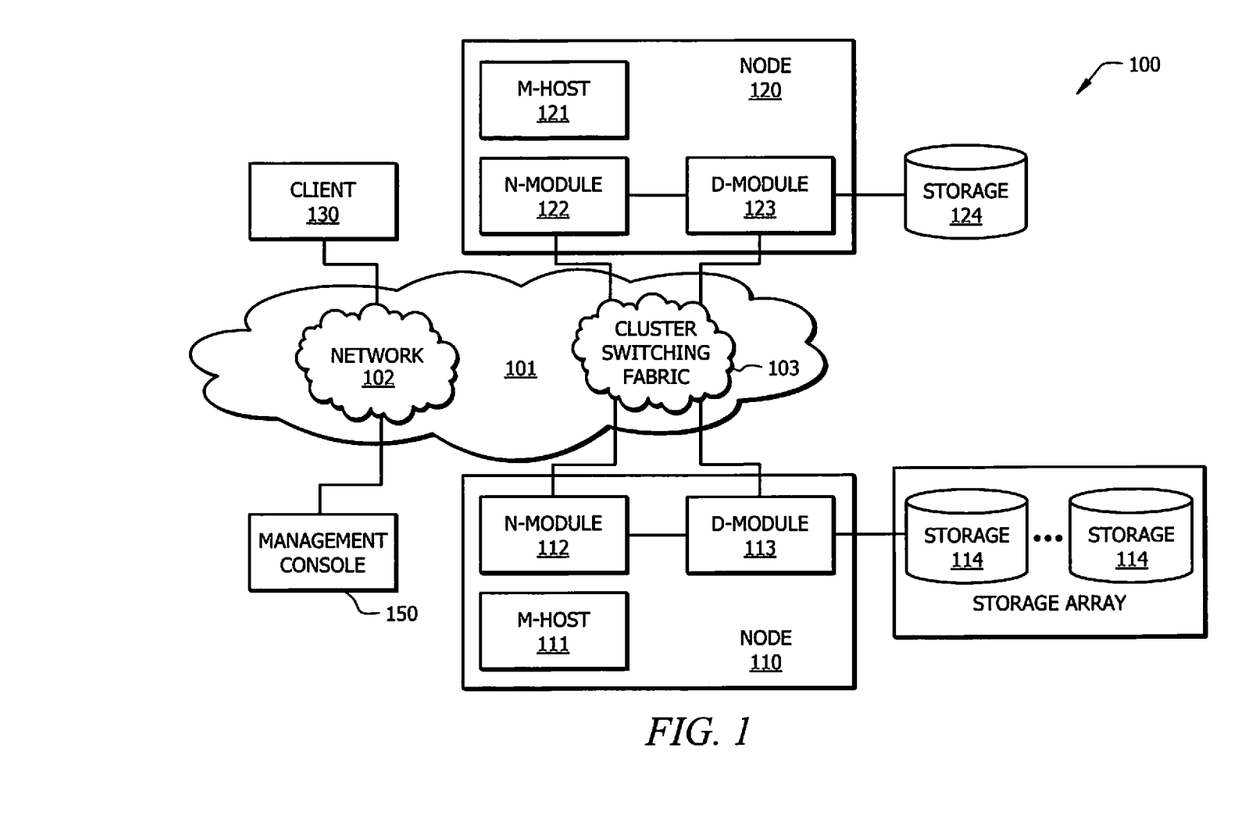
FIG. 1 is a block diagram of a storage system in accordance with an embodiment of the present invention.

FIG. 1 provides a block diagram of storage system 100 in accordance with an embodiment of the present invention. System 100 includes a storage cluster having multiple nodes 110 and 120 which are adapted to communicate with each other and any additional node of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120.

Illustratively, nodes (e.g., network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g., network-connected device 130) over computer network 101, while D-modules may connect to storage devices (e.g., as may implement a storage array). M-hosts may provide cluster communication services between nodes for generating information sharing operations and for presenting a distributed file system image for system 100. Functionality for enabling each node of a cluster to receive name and object data, receive data to be cached, and to communicate with any other node of the cluster may be provided by M-hosts adapted according to embodiments of the invention.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network—connected device 130 by a more general data network 102 (e.g., the Internet, a LAN, a WAN, etc.).

It should also be noted that while there is shown an equal number of N and D-modules constituting illustrated embodiments of nodes, there may be a different number and/or type of functional components embodying nodes in accordance with various embodiments of the present invention. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g., node configurations, operating metrics) from or provide information to the nodes. In addition, management console 150 may be configured to receive inputs from and provide outputs to a user of system 100 (e.g., storage administrator) thereby operating as a centralized management interface between the administrator and system 100. In the illustrative embodiment, management console 150 may be networked to network-connected devices 110-130, although other embodiments of the present invention may implement management console 150 as a functional component of a node or any other processing system connected to or constituting system 100.

In a distributed architecture, network-connected device 130 may submit an access request to a node for data stored at a remote node. As an example, an access request from network-connected device 130 may be sent to network-connected device 120 which may target a storage object (e.g., volume) on network-connected device 110 in storage 114. This access request may be directed through network-connected device 120 due to its proximity (e.g. it is closer to the edge than a device such as network-connected device 110) or ability to communicate more efficiently with device 130. To accelerate servicing of the access request and optimize cluster performance, network-connected device 120 may cache the requested volume in local memory or in storage 124. For instance, during initialization of network-connected device 120 as a cluster node, network-connected device 120 may request all or a portion of the volume from network-connected device 110 for storage at network-connected device 120 prior to an actual request by network-connected device 130 for such data.

As can be appreciated from the foregoing, in order to operate as a cluster (e.g., the aforementioned data storage system), network-connected devices 110-130 may communicate with each other. Such communication may include various forms of communication (e.g., point-to-point or unicast communication, multicast communication, etc.). Accordingly, to effectively cooperate to provide desired operation as a logical entity each node of a cluster is provided with the capability to communicate with any and all other nodes of the cluster according to embodiments of the invention.

Figure 2:
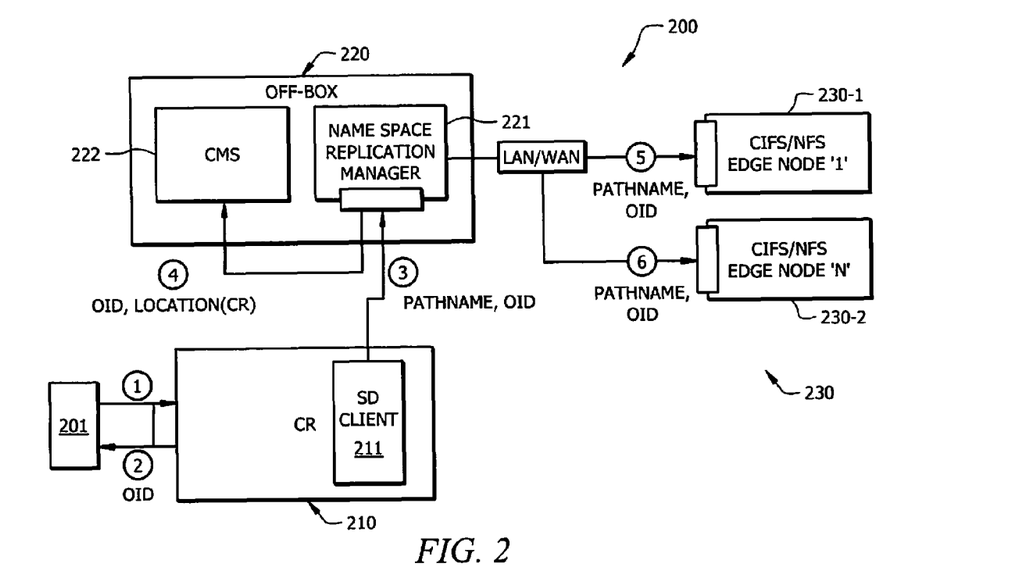
FIG. 2 is a block diagram illustrating a functional architecture of a geo-scale content distribution system in accordance with an embodiment of the present invention.

FIG. 2 is a block diagram illustrating a functional architecture of a geo-scale content distribution system 200 in accordance with an embodiment of the present invention. Such a content distribution system 200 may be implemented using system 100, or another type of system having suitable functionality. Content distribution system 200 includes content repository 210. Content repository 210 has mass storage capabilities and may include a storage array having multiple storage devices such as shown in FIG. 1. Content repository is configured to ingest data such as file 201 and store such data for later access. File 201 may be any type of digital data such as videos, photographs, documents, and the like. This ingestion may be taken via a number of protocols such as CIFS/NFS or HTTP/CDMI. File 201 is then issued a unique object ID and persisted on the content repository's volume.

Figure 3:
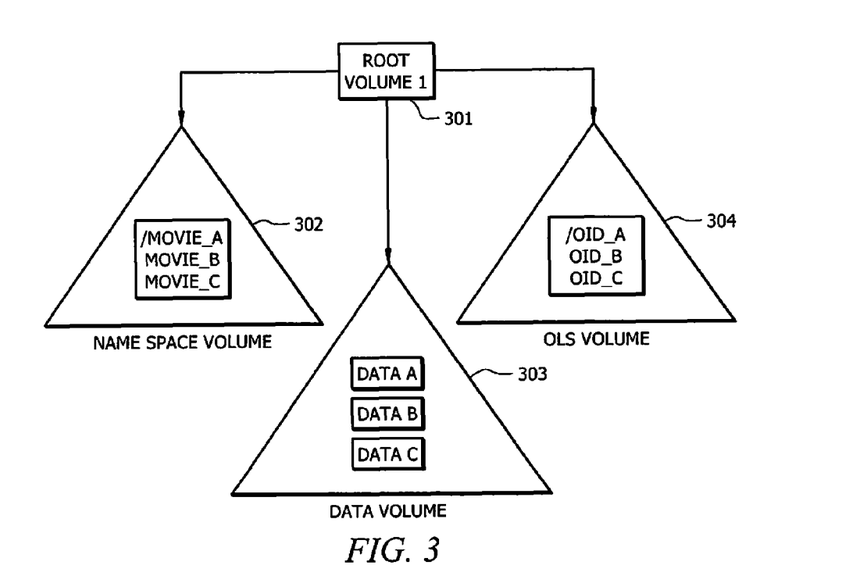
FIG. 3 illustrates a block diagram representing storage volumes and organization on a central repository for an ingested file.

FIG. 3 illustrates storage volumes and organization on a central repository for an ingested file. As shown, a root volume 301 contains volumes of information included in name space volume 302, data volume 303, and object location service (OLS) volume 304. An ingested file will have presence in each of these volumes. For example, a path name corresponding to the location of the file on the network will be stored in name space volume 302, an object identification is stored on OLS volume 304, and the payload data of the file is stored on data volume 303. Data stored in name space volume 302 and OLS volume 304 may be utilized as pointers to the actual data stored in data volume 303.

Referring back to FIG. 2, content repository 210 also comprises difference monitoring client 211 which is configured to monitor name and object space changes in volumes such as name space volume 302 and OLS volume 304. This may be accomplished by identifying inodes within those volumes which have been changed between two time periods, e.g. created, deleted, accessed, or otherwise modified.

In the illustrated embodiment, difference monitoring client 211 is a "snapdiff client" (SD client), however embodiments are not limited to any type of client. Snapdiff is a feature within content repository 210 wherein the client finds metadata changes and all file system changes that have happened within two snapshots. For example, suppose a first snapshot is taken, one or more files are modified, and then another snapshot is taken. A snapdiff of these two snapshots will yield information relating to the observed differences. Such observed differences can include, but are not limited to, observing that a file has been created, deleted, accessed or otherwise modified.

SD client 211 builds a list of path names for each changed inode. A sample output of SD client 211 for an OLS volume in accordance with one embodiment is shown below:

TABLE 1

| Inode | Generation | Change | Path |
|---|---|---|---|
| 27522 | 430199778 | CREATED | /f/15/0000031500190DFF014E882B96435011E1A919000C2946CC99 |
| 24234 | 430213682 | CREATED | /f/d/00000315001927A101A638113D435011E1A919000C2946CC99 |
| 10197 | 430213786 | CREATED | /5/14/00000315001991BE01A6D6B462435011E1A919000C2946CC99 |
| 14553 | 430213856 | CREATED | /10/9/000003150019E2AA01A756491C435011E1A919000C2946CC99 |
| 6741 | 430199533 | CREATED | /10/16/000003150019D978014D08D9E1435011E1A919000C2946CC99 |
| 6699 | 430199129 | CREATED | /1c/11/0000031500198624014A5A68C0435011E1A919000C2946CC99 |

As can be seen on the left side of TABLE 1, the listing includes an identification of each of the inodes which are changed. The second column reflects an ID which represents the freshness or staleness of a file. The third column indicates the type of change which has occurred, which in this example, the listing represents that that the respective inodes were created. The fourth column shows the path of the changed file in the OLS volume. In this embodiment the Object Identification (OID) is embedded within the path name in order to provide for more efficient conveyance of desired information.

SD client 211 may be configured to take snapshots at specific or random intervals. It is noted that the more frequent the snapshots are taken, the more accurate updates of the system may be reflected. However, frequent updates may present negative impacts in terms of overhead on the system. The frequency of snapshots may be adjusted in light of system requirements, the rate at which files are ingested, the bandwidth available for communication between devices in the storage network, and the like. Further, the timing of snapshots may be configured to be implemented during periods of reduced usage for the system, or after a specified number of files have been accessed/altered. This flexibility provides for scalability of content distribution system 200 because the functions of SD client 211 may be modified upon expansion/contraction of system 200 in order to maintain optimal functionality.

Content distribution system 200 further includes off-box component 220 which includes name space replication manager (NSRM) 221 and content metadata service module (CMS) 222. In the illustrated embodiment, off-box component 220 is shown as separate from content repository 210 and as a stand-alone unit. However, functionality of off-box component 200 may be implemented within other portions of a storage system such as within content repository 210, within management console 150 of FIG. 1, in a node 230, or across multiple nodes of a storage system such as within the D-module or M-Host of nodes 110 and 120 of FIG. 1.

NSRM 221 is configured to receive an output from SD client 211 representing information regarding file system changes in the storage system. For example, NSRM 221 may receive an output from SD client 211 such as shown above in Table 1 along with other metadata changes such as size, timestamp, file permissions, etc. With this information, the NSRM 221 creates or updates the stub files on the managed file system on off-box component 220 indicating the file system changes such as a path creation, deletion, etc. and persists the changes to components of system 200. In some embodiments, NSRM 221 creates multiple sessions equal to the number of edge nodes 230 and sends messages to the edge nodes 230 (e.g. over WAN) to create a name space as indicated in the message. Typically, messages sent from NSRM 221 will include a path name, OID, size, permissions of the file, and may contain other identifying information as desired. NSRM 221 may also provide updates to the CMS to share information about ingested files and their corresponding OIDs and location.

CMS 222 maintains a catalogue of ingested content and its location. Such content may be available at multiple locations such as on content repository 210 and/or on one or more edge nodes 230. In some embodiments, CSM 222 will also provide information to system 200 regarding where a particular file is stored with respect to a requesting node. For example, if a request for a video file enters the system via edge node 230-1, CMS 222 may recognize that the relevant file is located on content repository 210 and is cached on edge node 230-2. In this instance, CMS 222 may further direct the flow of data to edge node 230-1 to be received from either the closest or fastest source to improve latency.

In determining which portion of system 200 will be the fastest transmission point for the requested data, CMS 222 can take into account various factors. For example, CMS 222 may consider traffic on the system, transmission distance, the type of hardware and communication connections, etc., each of these factors may have impact on the efficiency of data transmission. In some embodiments, CMS 222 includes a weighting schema which weighs these various factors and makes a determination regarding the ideal path of data flow through system 200 and directs traffic accordingly.

In some embodiments, CMS 222 is configured to direct requested files to an edge node 230 from multiple sources such as one or more different edge nodes, multiple central repositories, or a combination of each. In such embodiments, CMS 222 can take into account distances and speeds to edge node 230 between multiple stored or cached copies and proportionally allocate transmission of the data. For example, in the event that a user requests multiple files, CMS 222 may recognize that the files are available at more than one node and determine that delivery of the files is better accomplished when sending a first file from a first node and a second file from a second node.

As shown, edge nodes 230 are connected to NSRM 220 of off-box component 220 via a LAN or WAN connection. Two nodes 230-1 and 230-2 are shown, however, system 200 may include an additional number of nodes if desired. NSRM 221 propagates information which may include path name, OID, size, permissions of the file, etc., to edge nodes 230 thereby providing for a single global name space across multiple geographically dispersed nodes. Such name space information may be used to provide access to system 200 via edge nodes 230 to users placed at different geographical locations while utilizing a protocol such as CIFS and NFS. Using such protocols to access storage system 200 provides for more efficient access to the end user and provides a vast improvement over previous solutions.

Figure 4:
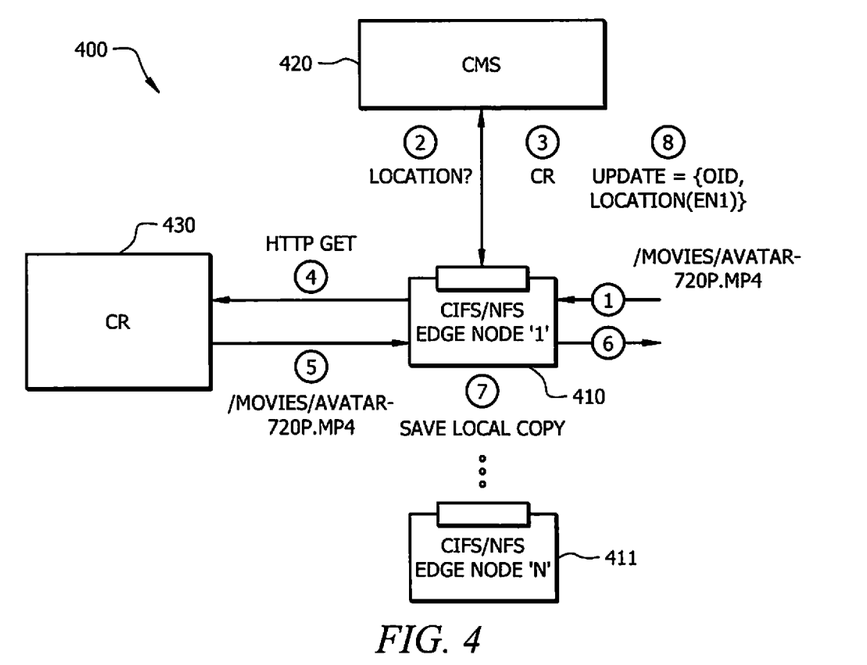
FIG. 4 shows a block diagram illustrating a functional architecture of a geo-scale content distribution system in accordance with an embodiment of the present invention.

FIG. 4 shows a block diagram illustrating a functional architecture of a geo-scale content distribution system 400 in accordance with an embodiment of the present invention. Such a content distribution system 400 may be implemented using system 100, or another type of system having suitable functionality. In this embodiment methods of caching and distributing the content are illustrated. Message 1 represents a request from a user (typically communicating via an application server) to have access to a file stored on content distribution system 400. This request may be sent using an application-layer protocols, such as CIFS, NFS. The request message is received at edge node 410. Edge node 410 includes name space information such that it can determine whether the requested file is included in content distribution system 400. The name space information further allows edge node 410 to receive an application-layer request and efficiently communicate with components of content distribution system 400 using storage-layer protocols, thereby bridging the communication gaps involving protocols between content distribution system 400 and external users without requiring additional specialized application-layer protocol messages and polling.

Edge node 410 requests location information for the requested data if a cached copy is not available on its disk storage from CMS 420 and CMS 420 instructs edge node 410 to obtain the requested file from content repository 430. Edge node 410 then sends a request to content repository 430. Such a request is implemented in an object based protocol, such as by using an HTTP/CDMI GET call. Maintaining the requests as object-based using storage-level protocols provides significant efficiency advantages as discussed herein.

Content repository 430 responds to the HTTP GET call by providing the requested file to edge node 410. Typically when edge node 410 receives a sufficient number of blocks of the requested file to serve the end user, the edge node begins transmitting the file to the end user.

During the transmission, or after the transmission is complete, edge node 410 caches a copy of the requested file locally. The caching of the requested file on edge node 410 represents a change to content distribution system 400. This change is reflected in an update in CMS 420. This updating process may be implemented as described above with respect to FIG. 2. As a result, if a subsequent user makes a request via edge node 411 for the same file, CMS 420 may direct the user to access the file from either the content repository 430 or edge node 410 in the event that the end user or distribution system are better served by utilizing the cached copy. The determination on where to direct edge node 411 to retrieve content may be made based on a variety of criteria which may take into account the speed of the file delivery, performance requirements for other aspects of content distribution system 420, etc.

In another example, second user request for the same file may come to edge node 410 when edge node 410 already has the requested file available in its cached content. In this example, the content is delivered to the user without the need to access other portions of content distribution system 400 which maintain the requested file in storage, thereby increasing the transmission efficiency of the content delivery.

Cached content may be maintained at one or more edge nodes, such as edge node 410 according to various preferences which may be determined according to regular design considerations of content distribution system 400. In one embodiment, cached versions of files are maintained for a specified time period. Another embodiment may maintain cached versions of files so long as sufficient memory is available to store the content. More intelligent techniques to manage cached content may also be used. For example, it may be advantageous to maintain files which are more likely to have a greater number of access requests at specific edge nodes. Such a technique could take into account differing preferences according to edge node location, etc. Further, a combination of the above techniques may be utilized. Embodiments are not necessarily limited by the manner in which cached content is maintained on an edge node.

Another advantage presented by the name space replication and content caching techniques presented herein is that it provides for scalability of a content distribution system while maintaining acceptable performance characteristics. Embodiments may be implemented using nodes that range from a few in number to using hundreds of nodes. The described content caching assists in distribution of traffic such that the load on a single storage resource is reduced. Additionally, name space replication methods may be scaled as described above (e.g. by altering SD intervals/queries and timing of updates) and provides for the framework to utilize the cached content. Such scalability is simplified over previous systems which would require more complicated polling methods to be implemented and must address communication protocol differences between user requests and storage system components.

Figure 5:
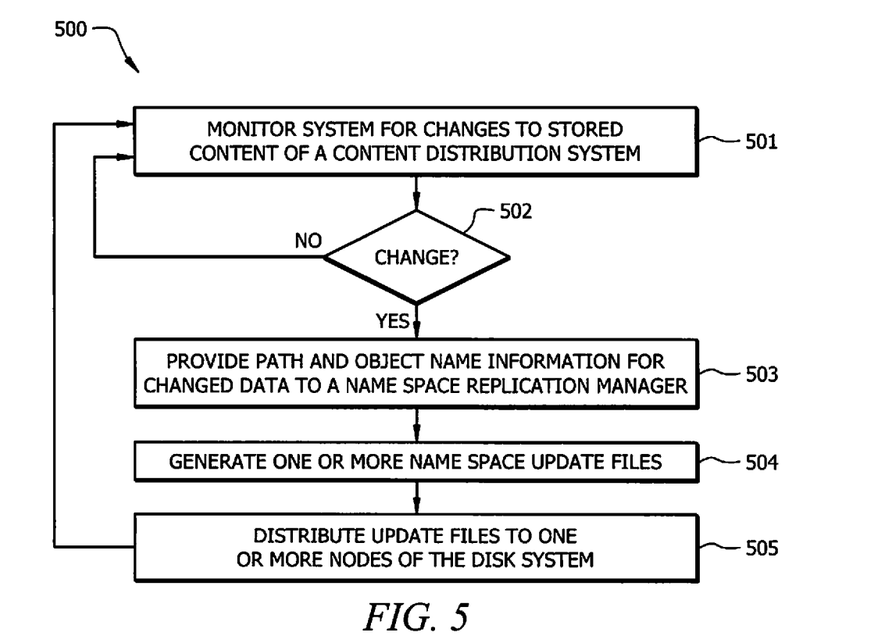
FIG. 5 shows a flow diagram illustrating a name space replication operation of a content distribution system in accordance with an embodiment of the present invention.

FIG. 5 shows a flow 500 illustrating operation of a system, such as content distribution system 200, in accordance with an embodiment of the present invention. At block 501 of the illustrated embodiment content distribution system 200 is monitored for changes to stored content. Such changes may include additions or deletions of data to system 200, modifications, and the like. It is noted that the monitoring of block 501 may be continuous, periodic, or may be configured to be implemented at any other specified interval to accomplish the efficient functionality of content distribution system 200.

Decision block 502 signifies that if no change in content distribution system 200 is noted, flow 500 continues monitoring for changes. In the event that a change is detected, pathname, OID and other attribute information for the changed data is provided to a name space replication manager (e.g. NSRM 221) at block 503. This information is processed and one or more name space update files are generated at block 504. Information contained in the update files will generally include path name information, OID information and file attribute information.

At block 505 the generated update files are distributed to one or more nodes 230 of content distribution system 200. In one embodiment, NSRM 221 creates multiple sessions equal to the number of edge nodes in distribution system 200 and sends the namespace updates to the edge nodes 230 over WAN to create namespace as indicated in the update message. Embodiments of the present invention are not limited to the type and manner of distribution. For example, NSRM 221 may accommodate multiple nodes in a single session, update files may be sent over multiple types of communication connections, and the like.

As noted, flow 500 may be configured to repeat, continuously run, etc. Accordingly, upon completion of the distribution of the update files at block 505, flow 500 may repeat itself.

Figure 6:
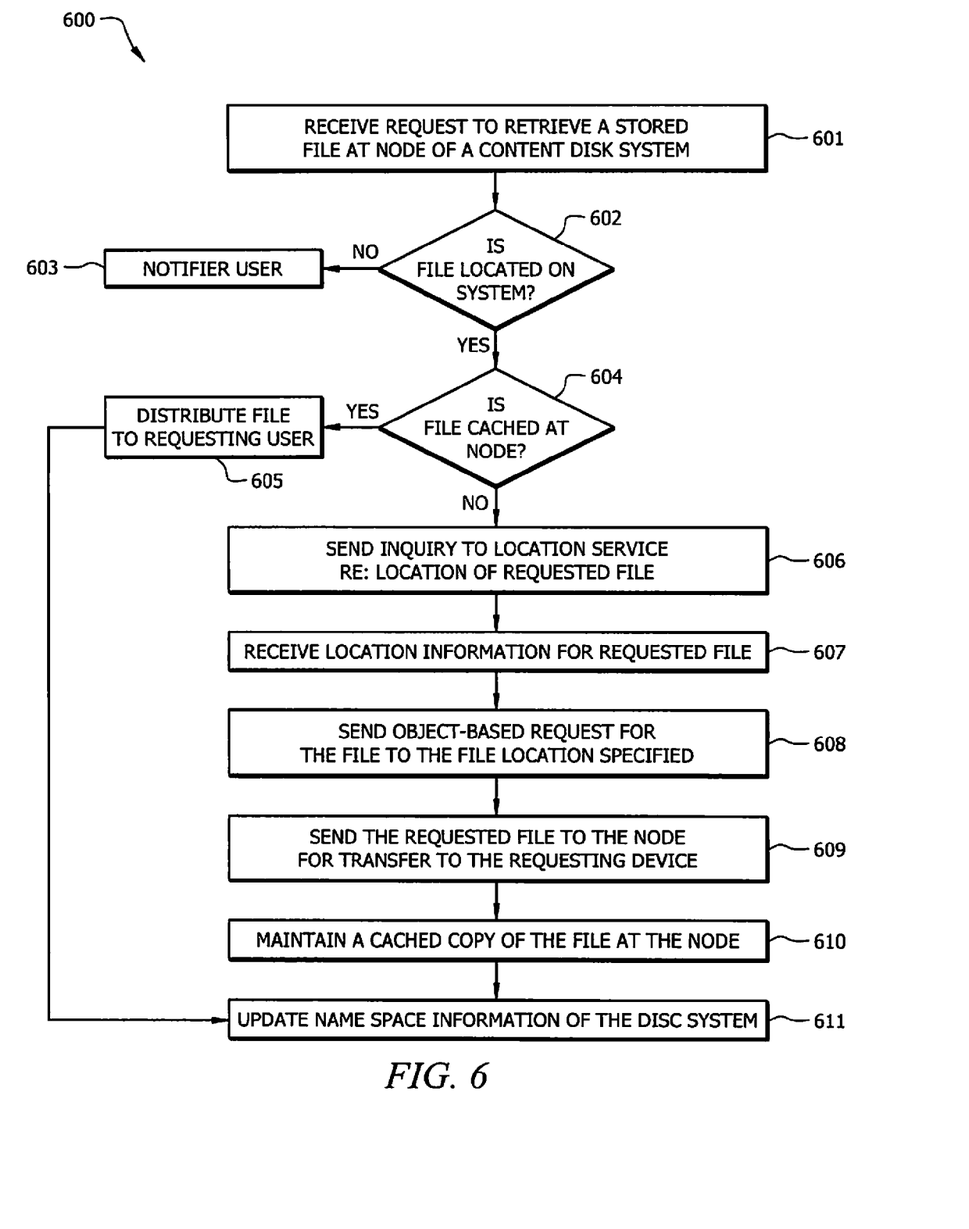
FIG. 6 shows a flow diagram illustrating a file transfer operation of a content distribution network in accordance with an embodiment of the present invention.

FIG. 6 shows a flow 600 illustrating a file transfer operation of a content distribution network, such as content distribution system 400, in accordance with an embodiment of the present invention. At block 601 a node, such as edge node 410, receives a request from a user to retrieve a stored file from content distribution system 400. Such a request will typically arrive as using filesystem-layer access protocols, such as CIFS/NFS, and will include identifying information for the requested file such as an object name, filename, and the like.

At decision block 602 the node receiving the request determines whether the requested file is listed within the name space index located locally on the node. This name space index preferably includes information pertaining to the presence of all data stored on a content distribution system, such as content distribution system 400. The name space index further allows edge node 410 to receive an application-layer request and efficiently communicate with components of content distribution system 400 using storage-layer/object-based protocols, thereby bridging the communication gaps involving protocols between content distribution system 400 and external users without requiring additional specialized application-layer protocol messages and polling.

In the event that the requested file is not located on distribution system 400, the requesting user is notified that the file is not found at block 603. It is noted that embodiments may rely solely on the name space index located locally on the node receiving the request, assuming that the node is sufficiently updated. Further, embodiments may implement a secondary inquiry to other portions of distribution system 400, such as to NSRM 221 (FIG. 2) or CMS 420, to ensure that accurate information is delivered to the user.

In the event that the name space index located on the node indicates that the request the file is located on the system, the node determines whether the file is cached locally at the node at decision block 604. If the requested file is cached at the node, it is then distributed to the requesting user at block 605. Update name space information of the disk system is performed at block 611.

When the requested file is not cached at the node receiving a request, the node sends an inquiry to a location service module, such as CMS 420, to request information regarding the location of the requested file at block 606. This request will typically be conveyed utilizing a storage-level protocol and will include an object name for the requested file.

The location service module then sends location information for the requested file to the node at block 607. This location information may comprise a single location on content distribution network 400. In cases where the requested file is available in multiple locations on content distribution network 400 (e.g. located on a central repository 430 and/or on one or more nodes such as node 411), the location service module may make a determination regarding which location is best suited to distribute the file. This determination may take into account multiple factors such as the speed of delivery to the user, current capabilities of distribution network 400, and the like. In another embodiment, the location service module may provide information regarding multiple locations where the requested content may be obtained. In this case, the node may attempt to retrieve the file from either location, e.g. using a second location as a backup in the event of a transfer failure from a first location.

At block 608, the node sends an object-based request for the requested file to the file location specified by the location service module. For example, the request may comprise an HTTP GET call that includes information regarding the requested file, such as path information, which allows the target location to locate the file in an efficient manner. Upon receiving the request, the specified location sends the requested file to the node for subsequent transfer to the requesting user device at block 609.

The edge node which is in communication with the user maintains a cached copy of the file in the node at block 610. This cached copy may be utilized in subsequent requests and distribution from that particular edge node or from another node as directed by the location service module. As discussed above, caching may be implemented according to any number of preferences which may be specific to the content distribution system being implemented. For example, it may be preferred to maintain a cached copy of a file at a node which has recently facilitated a request for a predetermined amount of time. Additionally, the determination of what to cache may be based on the amount of memory available at the edge node, the popularity of the file and its likelihood to be downloaded from that particular edge node or an adjacent edge node, etc.

Once the requested file has been transferred to user, and a cached copy has been written at the edge node, content distribution system 400 may then implement a name space information update such as discussed with respect to FIG. 5 at block 611. As this name space information is updated on content distribution system 400, subsequent requests for the particular file which has been cached to the edge node may utilize that edge node for file delivery.

It is noted that the flow diagrams described herein provide example implementations for systems and methods described in the present application. Various steps within these flow diagrams may be implemented in parallel or in a different order. As such, embodiments are not limited to the specific examples set forth.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for file caching comprising:
    receiving, by a storage node device of the content distribution network, a request in an application-layer protocol to retrieve a file stored on a content distribution network to an external user device;
    determining, by the storage node device, at least one location of a plurality of locations of the file on the content distribution network using an object-based index;
    determining, by the storage node device, which location of the determined at least one location or remaining locations of the plurality of locations is to be used based on a speed of delivery to a user and a best suited location to distribute the stored file to provide the requested file to the user;
    requesting, by the storage node device, a transfer of the file from the determined location using an object-based request; and
    receiving, by the storage node device, the requested file from the determined location for subsequent transmission to the external user.

2. The method of claim 1 further comprising caching the requested file at the edge node.

3. The method of claim 2 further comprising updating, by the storage node device, location data within a content metadata service module of the content distribution network to reflect that a copy of the requested file has been cached at the edge node.

4. The method of claim 3 wherein updating location data within a content metadata service module comprises:
    monitoring, by the storage node device, the content distribution network for changes in stored data on the network occurring between two points in time;
    providing, by the storage node device, a list of monitored changes to a name space replication manager;
    creating, by the storage device, an object-based name space update file which reflects the monitored changes in data stored on the network; and
    providing, by the edge node device, the object-based name space update file to the content metadata service module.

5. The method of claim 4 further comprising providing, by the storage node device, the object-based name space update file to one or more nodes of the content distribution network.

6. The method of claim 1 wherein the at least one location includes a cached copy of the file located on a different edge node of the content distribution network.

7. The method of claim 1 wherein the at least one location includes a copy of the file located on a central repository of the content distribution network.

8. The method of claim 1 wherein the determination of which location will be used to provide the requested file is made by implementing a weighting schema to determine which storage location will better facilitate the transfer.

9. The method of claim 1 wherein the request to retrieve a file comprises a request to retrieve a plurality of files and the location determined to provide the requested files is different for one or more of the requested files.

10. A non-transitory computer readable medium having stored thereon instructions for file caching comprising machine executable code which when executed by at least one processor, causes the processor to perform steps comprising:
    receiving a request in an application-layer protocol to retrieve a file stored on a content distribution network to an external user device;
    determining at least one location of a plurality of locations of the file on the content distribution network using an object-based index;
    determining which location of the determined at least one location or remaining locations of the plurality of locations is to be used based on a speed of delivery to a user and a best suited location to distribute the stored file to provide the requested file to the user;
    requesting a transfer of the file from the determined location using an object-based request; and
    receiving the requested file from the determined location for subsequent transmission to the external user.

11. The medium as set forth in claim 10 further comprising updating location data within a content metadata service module of the content distribution network to reflect that a copy of the requested file has been cached at the edge node.

12. The medium as set forth in claim 11 wherein updating location data within a content metadata service module comprises:
    monitoring the content distribution network for changes in stored data on the network occurring between two points in time;
    providing a list of monitored changes to a name space replication manager;
    creating an object-based name space update file which reflects the monitored changes in data stored on the network; and
    providing the object-based name space update file to the content metadata service module.

13. The medium as set forth in claim 10 wherein the at least one location includes a cached copy of the file located on a different edge node of the content distribution network.

14. The medium as set forth in claim 10 wherein the at least one location includes a copy of the file located on a central repository of the content distribution network.

15. The medium as set forth in claim 10 wherein the determination of which location will be used to provide the requested file is made by implementing a weighting schema to determine which storage location will better facilitate the transfer.

16. The medium as set forth in claim 10 wherein the request to retrieve a file comprises a request to retrieve a plurality of files and the location determined to provide the requested files is different for one or more of the requested files.

17. A storage node device comprising:
a processor;
a memory coupled to the processor which is configured to be capable of executing programmed instructions comprising and stored in the memory to:
receive a request in an application-layer protocol to retrieve a file stored on a content distribution network to an external user device;
determining at least one location of a plurality of locations of the file on the content distribution network using an object-based index;
determining which location of the determined at least one location or remaining locations of the plurality of locations is to be used based on a speed of delivery to a user and a best suited location to distribute the stored file to provide the requested file to the user;
request a transfer of the file from the determined location using an object-based request; and
receive the requested file from the determined location for subsequent transmission to the external user.

18. The device as set forth in claim 17 wherein the processor coupled to the memory is further configured to be capable of executing at least one additional programmed instruction comprising and stored in the memory to update location data within a content metadata service module of the content distribution network to reflect that a copy of the requested file has been cached at the edge node.

19. The device as set forth in claim 18 wherein updating location data within a content metadata service module comprises:
monitoring the content distribution network for changes in stored data on the network occurring between two points in time;
providing a list of monitored changes to a name space replication manager;
creating an object-based name space update file which reflects the monitored changes in data stored on the network; and
providing the object-based name space update file to the content metadata service module.

20. The device as set forth in claim 17 wherein the at least one location includes a cached copy of the file located on a different edge node of the content distribution network.

21. The device as set forth in claim 17 wherein the at least one location includes a copy of the file located on a central repository of the content distribution network.

22. The device as set forth in claim 17 wherein the determination of which location will be used to provide the requested file is made by implementing a weighting schema to determine which storage location will better facilitate the transfer.

23. The device as set forth in claim 17 wherein the request to retrieve a file comprises a request to retrieve a plurality of files and the location determined to provide the requested files is different for one or more of the requested files.

* * * * *